CALL TRACING ARRANGEMENT

Filed Dec. 27, 1965 4 Sheets-Sheet 1

INVENTORS C. ABERT
J. P. RUNYON
A. ZAROUNI
BY SEHollander
ATTORNEY

CALL TRACING ARRANGEMENT

United States Patent Office 3,471,647

Patented Oct. 7, 1969

3,471,647

CALL TRACING ARRANGEMENT

Charles Abert, Mantoloking, John P. Runyon, Fair Haven, and Alfred Zarouni, Middletown, N.J., assignors to Bell Telephone Laboratories, Incorporated, New York, N.Y., a corporation of New York Filed Dec. 27, 1965, Ser. No. 516,617
Int. Cl. H04m 3/02
U.S. Cl. 179—18 13 Claims

ABSTRACT OF THE DISCLOSURE

A telephone system is disclosed having arrangements for identifying the origin of calls to a particular called line. Before ringing the called station, a simulated audible ringing signal is transmitted over the connection to the calling line. Upon detecting the simulated audible ringing on a connection, scanning circuitry holds that connection and a ringing signal is transmitted to the called station. The called station must then signal over the connection to continue holding the connection for identification.

This invention relates to telephone systems and particularly to arrangements for enabling the origin of calls in such systems to be traced.

In a more particular aspect this invention relates to call tracing arrangements wherein instrumentalities are furnished to a customer receiving annoying calls to facilitate the discovery of the anonymous caller.

In telephone systems and particularly in automatic systems it is sometimes desirable to hold a connection to permit the call to be traced to its origin. For example, telephone customers are occasionally annoyed, insulted and even threatened by anonymous calls, and moreover, the need arises in connection with police work for determining the source of certain calls such as bomb threats and calls of an obscene nature. While numerous expedients have been used in the past for trapping nuisance calls, these expedients lack certain features which we have incorporated in the present invention.

Many prior art arrangements for instance are only suitable for use in trapping intraoffice calls, that is, calls which originate and terminate within the same switching office. These arrangements generally transfer control of the connection to the called customer who is furnished with facilities for placing a holding condition on the intraoffice switchtrain. This holding condition might consist of placing a potential on the sleeve or control conductor of the connection to prevent the release of the local switchtrain.

It is well known, however, that in most telephone switching systems the conductors which control the holding of a switchtrain in one office do not extend beyond that office. In other words, on calls involving two or more switching offices the holding up of a switchtrain at the terminating office will generally not prevent the release of switchtrains at other offices such as the originating office involved in the connection.

To facilitate the holding of intraoffice connections for call tracing, various arrangements have been devised. Certain known prior art arrangements transmit a marking tone over the nuisance call connection from the called office to the calling office. Tone detectors at the calling office respond to the marking tone and place a holding condition on the switchtrain thereat. While these arrangements are suitable for their intended purpose, they have inherent problems which we have sought to overcome with the present invention. For example, if an audible marking tone is used, the nuisance caller may be forewarned that the call is being trapped and disconnect before the connection can be held for tracing. On the other hand, if the marking tone transmitted from the called office is outside of the voice frequency range, it may not be passed over those telephone facilities which can only accommodate signals in the voice frequency range. The frequencies outside of the voice frequency spectrum which can be transmitted over these facilities are generally used as carrier waves or for supervisory signals and the like.

Instead of sending marking signals over the nuisance call connection, certain prior art arrangements have special provisions for signaling the calling office to hold a connection by signaling over a separate channel. Of course, the obvious disadvantage with these arrangements lies in their use of additional interoffice trunking facilities in order to trap the nuisance call.

It is, therefore, one object of our invention to improve nuisance call tracing arrangements which are suitably adapted for both interoffice and intraoffice calls.

Many other prior art call tracing arrangements also require that the annoyed customer actuate some device after the call has been answered and the called customer has determined that the call is of a malicious nature. These arrangements, of course, are not effective in those situations where the nuisance caller places a call to the annoyed party and immediately disconnects as soon as the called party answers without allowing sufficient time for the called party to actuate the call trapping devices.

It is, therefore, another object of our invention to improve nuisance call trapping arrangements to insure that the nuisance caller is not forewarned of the impending trap.

In accordance with one illustrative embodiment of our invention, the telephone line of the recipient of annoying calls is equipped with special apparatus to facilitate the trapping and tracing of nuisance calls. More specifically, the called customer's line is arranged so that the application of a ringing signal to the called station is delayed to permit the nuisance call connection to be identified before the called party's station is rung. Thus, when a call is completed to the specially equipped called line, the central office ringing signal is tripped and a special audible signal, which simulates the conventional audible ringing signal, is transmitted back over the connection to the calling customer. The nuisance caller hears this simulated audible ringing signal and believes that the called station is being rung. Instead, scanning equipment at the calling customer's office is scanning over telephone circuits, such as outgoing trunks, searching for the presence of the simulated audible ringing signal. Once the trunk involved in a nuisance call connection is located, the scanner locks to the trunk holding the local switchtrain at the calling office.

Having delayed the ringing signal at the called customer's office for sufficient time to permit the scanner at the calling office to locate the nuisance call connection, a ringing signal is applied to the called line to alert the called customer. When the called customer answers, the connection is automatically held for a predetermined interval under control of the scanner circuitry to prevent the calling customer from disconnecting. It is during this interval that the called party can initiate action to ascertain the identity of the calling customer. The called customer merely operates a signaling device at his station to transmit a burst of noise, which is modulated by a low frequency data signal, over the nuisance call connection. At the calling office the low frequency signal is detected and steps are taken to identify the calling customer by manually tracing the connection or by an automatic number identification of the calling line. Should the called customer decide not to initiate the identification of the calling line, the scanning circuitry will time out and remove the holding condition from the connection.

Of course, it will be realized that although one exemplary embodiment of our invention has been described with respect to the tracing of interoffice calls, the arrangement is equally suitable for tracing calls originating and terminating in the same switching office.

A feature of our invention resides in a call tracing arrangement wherein the nuisance call connection is located before the called customer answers.

Another feature of our invention is found in a nuisance call trapping arrangement wherein the connection is automatically held before the annoyed party answers.

A further feature of our invention resides in a nuisance call trapping arrangement wherein the ringing signal to the called customer is delayed and a spurious audible ringing signal is transmitted over the nuisance call connection to mark the connection for trapping.

These and other objects and features of the invention will become readily apparent from the following description with respect to the drawing, in which.

ARRANGEMENT OF EQUIPMENT

Figure 1:
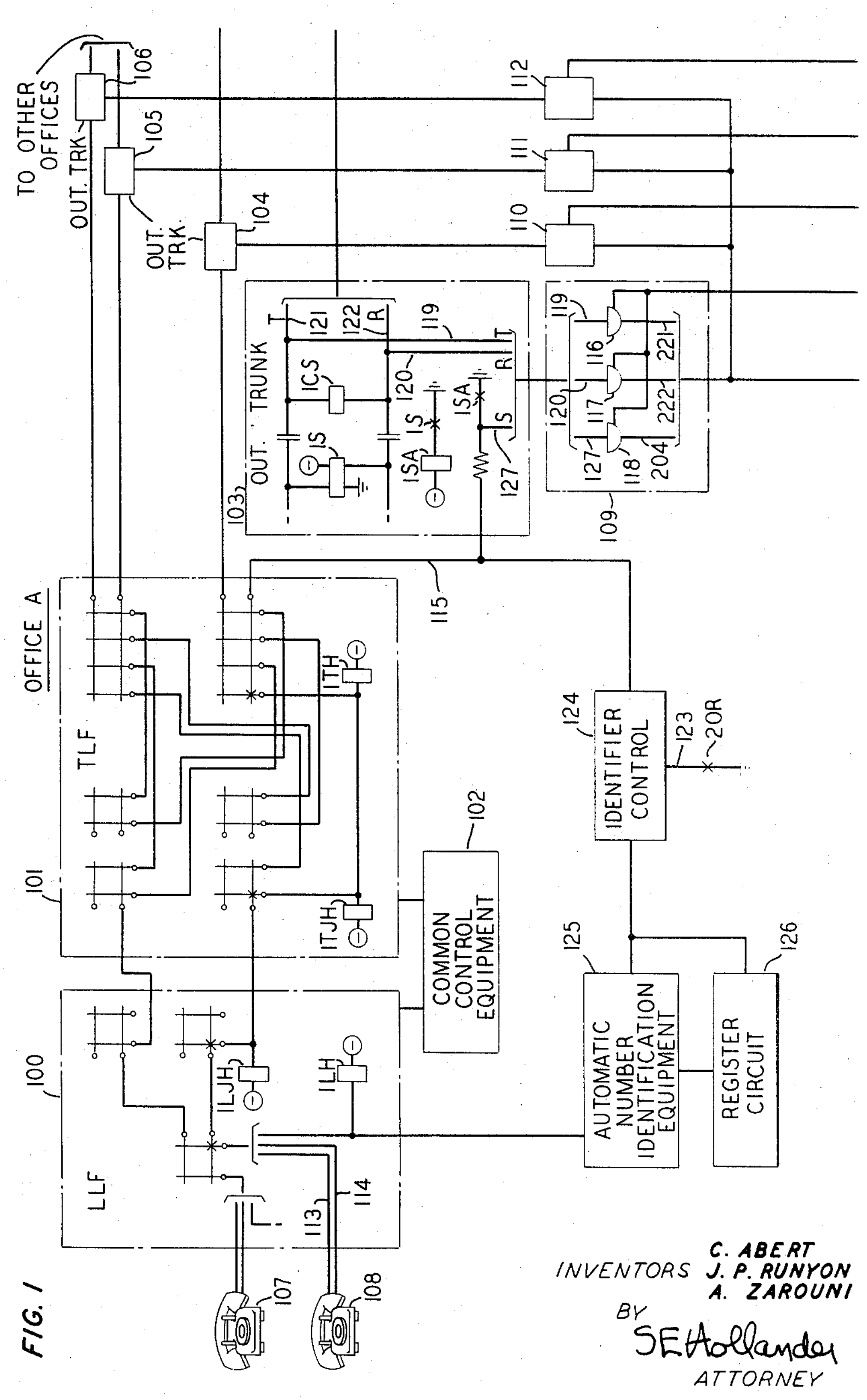
FIG. 1 depicts a portion of a first telephone switching office A arranged for trapping nuisance calls.

Turning first to FIG. 1 there is shown a block diagram of a typical telephone switching office designated office A. Switching office A can be any one of the many types of well-known switching offices such as step-by-step, crossbar, etc. A typical system adaptable for use in our invention is disclosed in Patent 2,585,904 to A. J. Busch of Feb. 19, 1952, and the Busch patent is hereby incorporated by reference as though fully disclosed herein.

In the Busch patent there is shown a crossbar telephone system comprising line link frames, such as frame 100, on which customer lines appear, trunk link frames such as frame 101 on which trunks appear and common control equipment (represented herein by block diagram 102) which controls the establishment of communication channels between customer lines and trunks. While it is to be understood that office A serves many customer lines and many trunks, only trunks 103–106 and only customer stations 107 and 108 have been shown to simplify the drawing.

Figure 3:
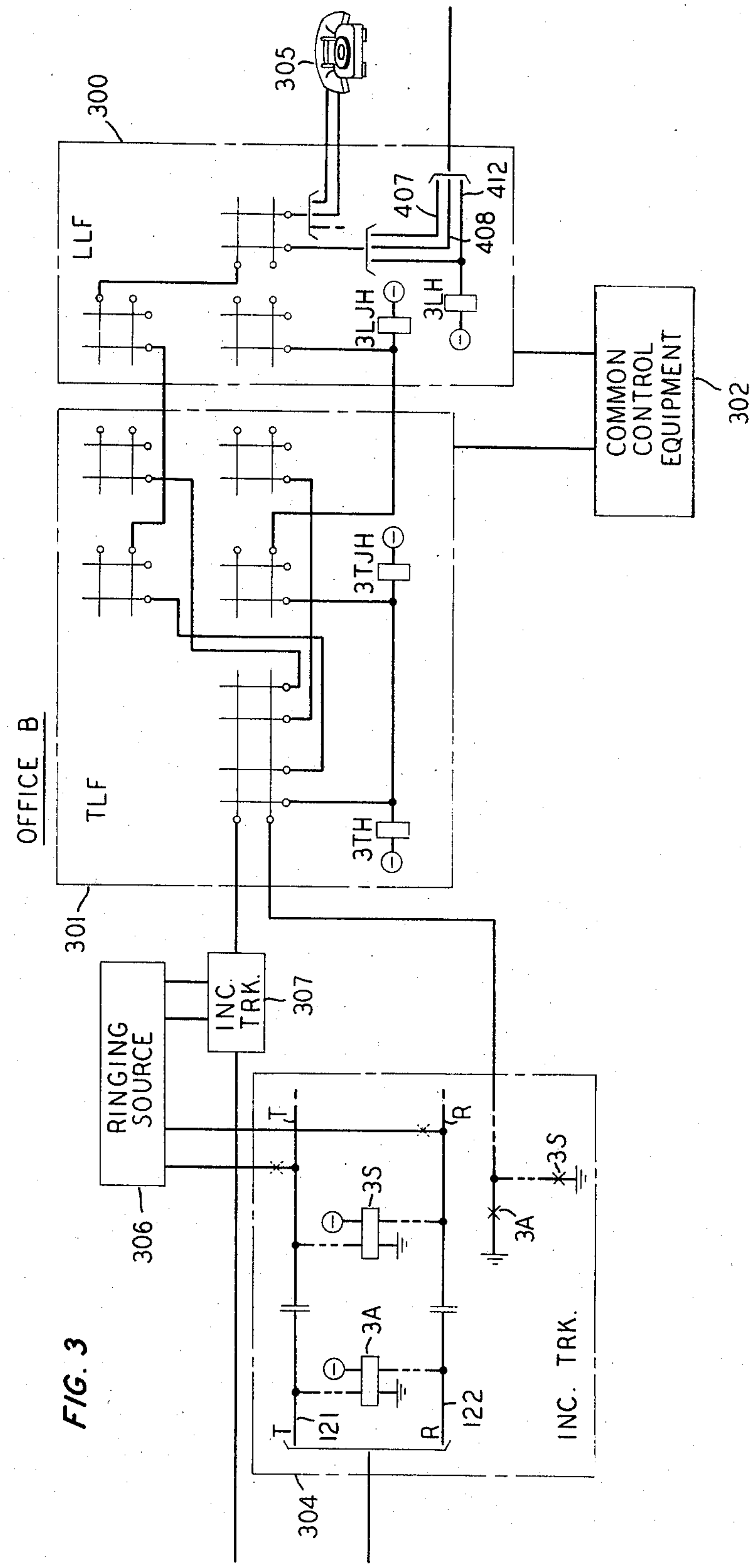
FIG. 3 depicts a portion of a second telephone switching office B which serves a customer who is receiving nuisance calls.

The switching office designated office B in FIG. 3 can be identical to the office A shown in FIG. 1. Office B comprises line link frame 300, trunk link frame 301 and common control equipment represented by the block diagram 302. Like office A, office B can serve many customers; however, only customer station 305 in FIG. 3 and station 400 in FIG. 4 have been shown in the drawing.

Customer stations such as station 305 in FIG. 3 are normally connected over line conductors to line equipment located on line link frame 300. Let it be assumed, however, that the customer at station 400 in FIG. 4 has been receiving anonymous calls and wishes to have these calls traced. Accordingly, those customers whose lines are equipped to trap annoyance calls will be equipped with special facilities as illustratively shown in FIG. 4. These special facilities for station 400 comprise a ringing detector 401 for detecting and tripping the central office ringing signal, a special simulated audible ringing source 402 which is used to mark the nuisance call connection and an interrupter 403 for coupling the simulated audible ringing source to the nuisance call connection. A ringing source 404 is also furnished for ringing station 400 after sufficient time has been allowed to identify the nuisance call connection at the calling office. While ringing source 404 has been shown as a separate block diagram, it will be obvious that all ringing signals could be furnished from a single ringing source such as the central office ringing source 306 in FIG. 3.

In addition, noise generator 405, low frequency modulator 406, auxiliary signal source 430 and other circuitry are provided for signaling over the nuisance call connection to facilitate trapping the nuisance caller. The operation of the circuitry associated with the called customer's line will be better understood from a subtrapping of a typical nuisance call will be described.

Figure 2:
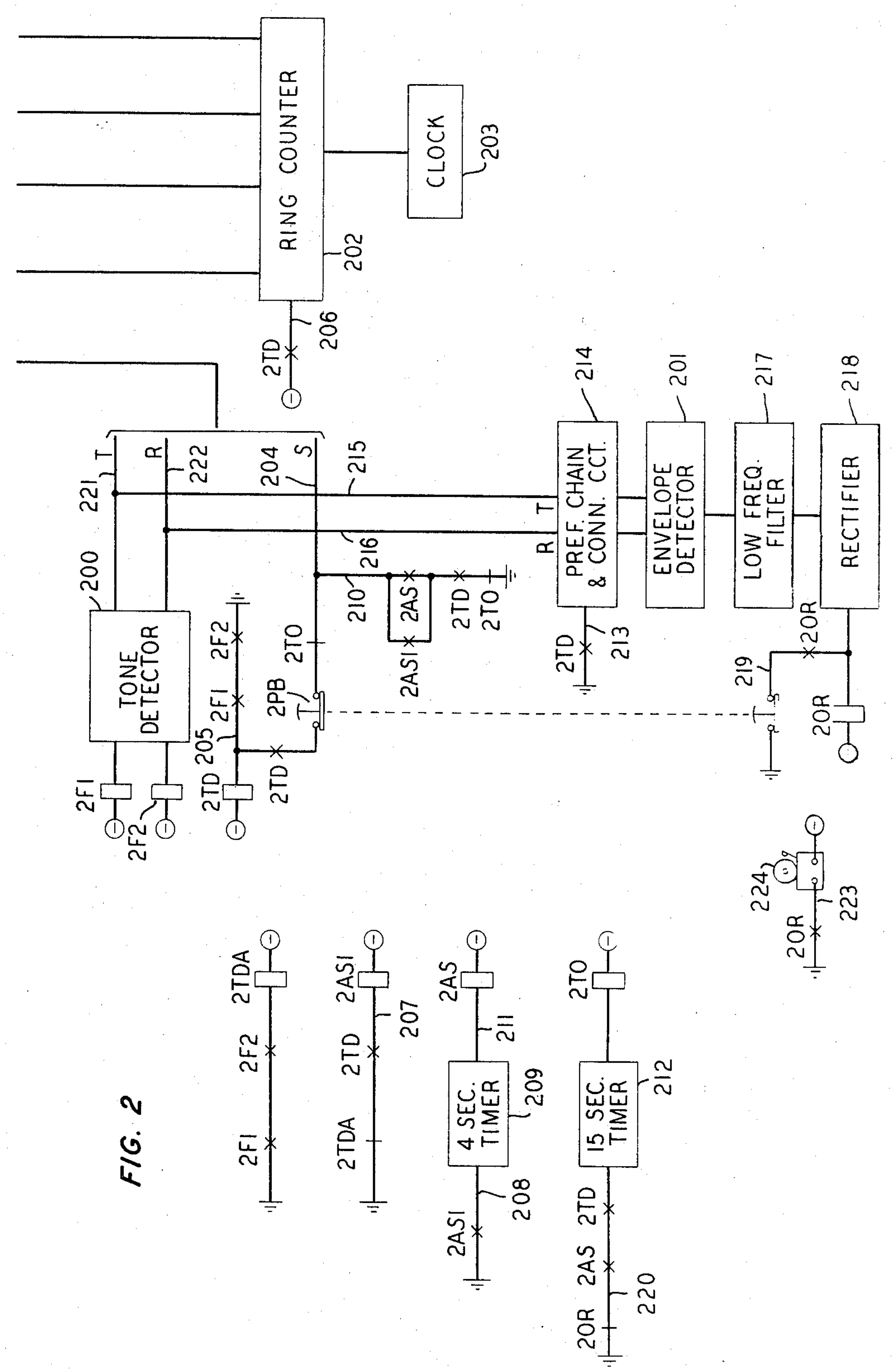
FIG. 2 shows a portion of the scanner and tone detecting circuitry for use in identifying nuisance calls at switching office A.

Turning now to FIG. 2 there is shown circuitry associated with switching office A for trapping nuisance calls which originate at that office. Typically, the trunks which originate at office A are provided with gate circuits generally indicated by the block diagrams 109–112, in FIG. 1 and these gate circuits are enabled by ring counter 202 to extend certain conductors from each trunk to detector circuits 200 and 201 in FIG. 2. Tone detector 200 comprises a typical well-known detector responsive to the simulated audible ringing signal tone which is sent from the called customer line to mark a nuisance call connection and envelope detector 201 is responsive to the low frequency auxiliary signal initiated by the called customer to trap the particular nuisance call.

The trunk circuits 103–106 are scanned for the presence of a nuisance call marking tone by successively connecting each trunk to the detector circuitry through the enablement of gate circuits 109–112, respectively. The gate circuits are enabled by the operation of ring counter 202 which is driven by clock pulse source 203. To simplify the drawing, ring counter 202 has been shown in block diagram form and it will be realized that many of the well-known counters found in the prior art can be utilized in our invention. Examples of such counters are found in Patent 2,812,385 to A. E. Joel, Jr., et al. of Nov. 3, 1957, and the Joel et al. patent is hereby incorporated by reference as though fully disclosed herein.

While we have shown outgoing trunks being scanned at office A, it will be realized that other circuits in the communication path might readily be scanned for the presence of the nuisance call marking tone. For example, one might scan the customer lines directly or certain portions of the communication channels between the customer lines and trunks.

Also shown in FIG. 1 is a block diagram of a typical automatic number identification arrangement which can be used to automatically identify the calling party instead of manually tracing the connection through the switchtrain at office A.

DETAILED DESCRIPTION

To illustrate the overall operation of the invention contemplated, a detailed description will now be given assuming that the customer at station 400, served by switching office B, has been receiving anonymous calls from a customer such as the customer served by station 108 at switching office A.

While the customers at stations 400 and 108 are shown being served by adjacent switching offices, it is obvious that offices A and B might be separated by intermediate offices, or on the other hand, the customers at stations 400 and 108 might be served by the same switching office without departing from the spirit and scope of the instant invention.

When the customer 108 at switching office A initiated a call to customer 400 at office B, the common control equipment 102 at office A selected an idle outgoing trunk such as trunk 103 to office B. Having selected the trunk, the called customer's telephone number was outpulsed over the trunk conductors 121 and 122 to the common control equipment in office B, and the tip, ring and sleeve conductors associated with customer 108 were connected over a channel to the tip, ring and sleeve conductors of outgoing trunk circuit 103. To simplify the drawing only a single line representing the sleeve conductor of the channel has been shown on the line link and trunk link frames 100 and 101, respectively, and it will be realized that other conductors are extended between the line and trunk by the actuation of the crossbar switches on these frames.

It was shown in the aforementioned Busch patent that the sleeve conductor controlled the release of a channel by maintaining appropriate hold magnets operated on each of the switch frames. More specifically, when the customer at station 108 has his receiver off-hook, a loop circuit is completed over his tip and ring conductors 113 and 114, respectively, for operating supervisory relay 1S in trunk circuit 103. Relay 1S, in operating, operates auxiliary relay 1SA which places a ground on sleeve lead 115. This ground is extended through operated crosspoints on each of the switches of the line link and trunk link frames to hold the connection by maintaining operated trunk hold magnet 1TH and trunk junctor hold magnet 1TJH on the trunk link frame and line junctor hold magnet 1LJH and line hold magnet 1LH on the line link frame.

Seizure of the outgoing trunk circuit 103 at office A results in the corresponding actuation of incoming trunk circuit 304 at office B, and the trunk circuit 304 bids for service by common control equipment 302. Common control equipment 302 responds to the called number outpulsed from office A and a channel is established between incoming trunk circuit 304 and the line serving the customer at station 400. As in FIG. 1 (office A) the channel shown in FIG. 3 (office B) has been simplified to show only the sleeve or control conductor thereat.

When a channel has been completed to the called line, trunk circuit 304 applies a ringing signal from central office ringing source 306 over the channel to signal the customer at station 400. Ringing source 306 can be any one of the many well-known types of ringing sources which supply an interrupted ringing signal. In the example being assumed, source 306 provides a series of 20 cycle alternating-current ringing bursts each of two seconds' duration followed by a four-second silent interval; however, the invention is equally suitable for use in tone ringer arrangements as shown, for example, in Patent 2,824,173 to L. A. Meacham of Feb. 18, 1958.

Under normal circuit operation, the customer's station ringer would be actuated by each two-second ringing burst with an audible ringing signal being returned to the calling customer indicating that the called station is being rung. In the example under consideration, however, customer 400 has been receiving nuisance calls, and to permit the nuisance call connection to be identified at the calling office, the ringing signal to the called customer's station 400 will be delayed for a short period of time. When the first ringing burst is transmitted from central office ringing source 306 over the channel to line conductors 407 and 408 in FIG. 4, it is also extended to ringing detector 401 over conductors 409 and 410, through normal contacts of relay 4RB, over conductors 413 and 414 and through capacitor C4 to the network comprising diodes D1–D4 and relay 4R. The diodes D1–D4 comprise a full wave rectifier to rectify the alternating-current ringing signal and operate relay 4R during the first ringing burst.

Relay 4R, in operating, closes its contacts to connect ground over conductor 411 to operate relay 4RB. Relay 4RB, in operating, locks in a circuit traced from battery, through its winding, normal contacts of relay 4TP and through its own operated contacts to ground from trunk circuit 304, over sleeve conductor 412.

Relay 4R also closes its contacts to connect the gas tube diode 4T between conductors 413 and 414. The gas tube diode 4T breaks down in the presence of the ringing potential from central office ringing source 306 and provides a low impedance circuit between conductors 413 and 414.

This low impedance circuit trips the ringing from ringing source 306 in a well-known manner.

Figures 4, 5:
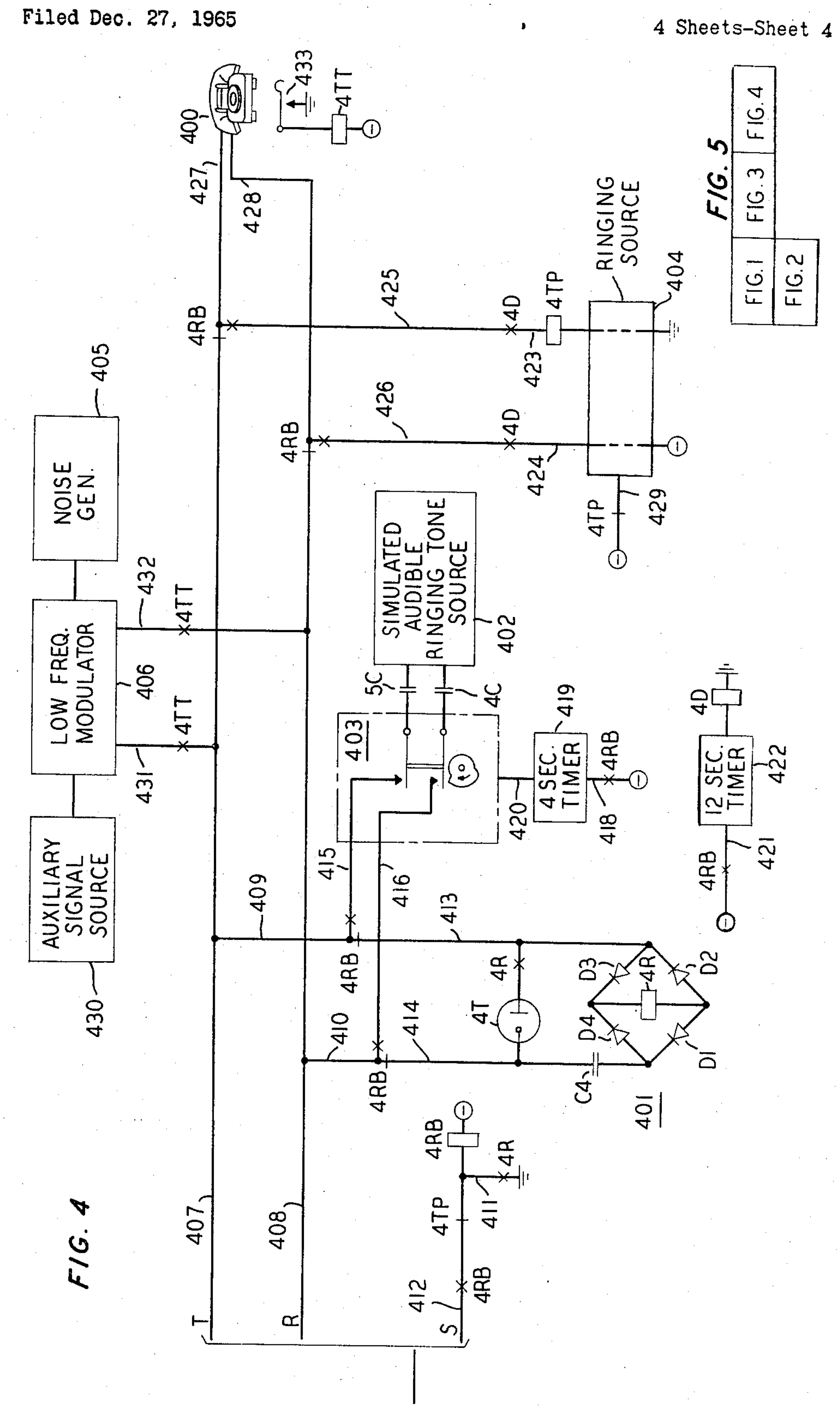
FIG. 4 shows the station equipment of the recipient of anonymous calls and circuitry to facilitate the trapping of these calls.
FIG. 5 shows the arrangement of FIGS. 1–4.

When relay 4RB operates, it actuates its transfer contacts in FIG. 4 to disconnect conductors 409 and 410 from ringing detector 401 and connect these conductors over conductors 415 and 416, respectively, to interrupter 403. Although the calling customer heard a short burst of the conventional audible ringing signal which might comprise a 480 c.p.s. tone modulated with a 40 c.p.s. signal from central office ringing source 306, the signal now transmitted to the calling customer will be a simulated audible ringing tone furnished from source 402. Interrupter 403 when actuated will close its contacts to connect the simulated audible ringing tone from source 402 through capacitors 4C and 5C and back over the communication path to calling customer 108 to mark the connection as a nuisance call. The simulated audible ringing tone furnished by source 402 is selected to closely resemble the conventional audible ringing signal which is normally furnished to a calling customer when the called customer's station is being rung from the central office ringing source 306. More specifically, and in accordance with one feature of our invention, by selecting certain frequencies it is possible to produce a simulated audible ringing tone which differs in frequency from the conventional audible ringing signal by such a slight degree that the difference would be imperceptible to the average listener. Yet, the frequency of the simulated audible ringing tone and the conventional audible ringing signal are sufficiently different that detectors located at the nuisance caller's office will respond only to the simulated audible ringing tone and not falsely respond to the conventional audible ringing signal.

By way of example, the simulated audible ringing tone could be made up of two frequencies such as 530 c.p.s. and 570 c.p.s. Two frequencies would be used as an added safety measure to preclude false trapping, since it is unlikely that these two tones would be simultaneously present on a connection not equipped to trap nuisance calls. Also, as mentioned above, the conventional audible ringing signal might comprise a 480 c.p.s. tone modulated at 40 c.p.s.

The operation of interrupter 403 to transmit the simulated audible ringing signal to the calling party is delayed for four seconds to provide a normal silent interval after the receipt of the first ringing signal from the central office ringing source 306. When relay 4RB operated, it placed battery on conductor 418 to start the four-second timer 419. Timer 419 operates after a four-second delay and signals over conductor 420 to operate interrupter 403. When interrupter 403 operates, it intermittently closes its contacts to transmit two-second tone bursts of the simulated audible ringing tone from source 402. Each two-second tone burst is followed by a four-second silent interval under the control of interrupter 403. By operating the circuit in this manner the calling party will think that the called station is being rung and wait for the called party to answer when in reality the simulated audible ringing signal that the calling party hears is being used to locate the nuisance call connection at the calling party's office.

When relay 4RB operated, it also connected battery over conductor 421 to start a 12-second timer 422. Timer 422 begins timing to allow at least two tone bursts of simulated audible ringing tone to be transmitted back over the connection to the calling office before called customer's station ringer is actuated. This allows the scanner circuitry at the calling office sufficient time to scan all of the trunks for the presence of the simulated audible ring employed as a nuisance call marking tone.

At the end of the 12-second time interval, relay 4D operates and ringing source 404 is connected through the winding of tripping relay 4TP, over conductors 423 and 424, through operated contacts of relay 4D, over conductors 425 and 426, through operated contacts of relay 4RB and over the tip and ring conductors 427 and 428, respectively, to station 400 to actuate the station ringer and alert the called customer thereat. Ringing source 404 might be synchronized with interrupter 403 to apply the ringing signal to the line as soon as possible, thus minimizing the time the connection is held before the called station is alerted.

Meanwhile, at the calling office A, clock pulse source 203 is delivering pulses to ring counter 202, and ring counter 202 is scanning the trunks originating at office A by successively enabling each of gate circuits 109–112. The trunks are scanned at a fast enough rate to enable all trunks associated with a particular ring counter to be scanned during the interval when the simulated audible ringing tone is applied to the nuisance call connection.

Let it now be assumed that ring counter 202 has enabled gates 116, 117 and 118 in gate circuit 109 thereby extending the tip, ring and sleeve conductors of the trunk circuit 103 to the detector circuitry depicted in FIG. 2. Since trunk circuit 103 is being used on the nuisance call, the simulated audible ringing tone from source 402 will be present on the tip and ring conductors 121 and 122 and this tone will be extended over conductors 119 and 120 through gates 116 and 117 and over conductors 221 and 222 to tone detector 200. Tone detector 200 can be any one of many well-known types of detectors which will respond to the frequency of the simulated audible ringing tone and not the conventional audible ringing signal. An example of a detector suitable for use in our invention is shown in Patent 2,077,537 to J. W. Taylor of Apr. 20, 1937, and the Taylor patent is hereby incorporated by reference as though fully disclosed herein. Tone detector 200 responds in the presence of the two preselected frequencies of the simulated audible ringing tone to operate relays 2F1 and 2F2.

With relays 2F1 and 2F2 operated, ground is extended over conductor 205 to operate relay 2TD, and relay 2TD locks in a circuit including its own contacts, contacts of pushbutton 2PB, normal contacts of relay 2TO and ground which is being furnished from contacts of relay 1SA, over conductor 127, through enabled gate 118 and over conductor 204.

Relay 2TD, in operating, extends battery over conductor 206 to stop ring counter 202 from scanning and lock the ring counter to the trunk circuit 103 over which the simulated audible ringing tone was detected.

Relay 2TD, in operating, also connects ground over start lead 213 to preference chain and connector circuit 214. The preference chain and connector circuit 214 permits other scanning circuits to function on a preferential basis with the common envelope detector 201. With circuit 214 operated the tip and ring conductors 215 and 216 are extended to the envelope detector 201 to detect the presence of the low frequency modulated noise signal which may be transmitted by the called customer.

When relays 2F1 and 2F2 operated, an obvious circuit was completed in FIG. 2 for operating relay 2TDA which does nothing further at this time.

At the end of the first two-second tone burst of the simulated audible ringing tone relays 2F1 and 2F2 release. The release of these relays cause relay 2TDA to release, but relay 2TD remains locked to ground over the sleeve conductor 204. With relay 2TDA released and relay 2TD operated, ground is extended over conductor 207 to provide an obvious circuit for operating relay 2AS1. When relay 2AS1 is operated, it extends ground from normal contacts of relay 2TO, through operated contacts of relay 2TD, through its own operated contacts and over conductor 210 to sleeve conductor 204 to prevent the release of the connection at office A should the calling customer try to disconnect at this time.

Thus, during the presence of the simulated audible ringing tone relays 2F1 and 2F2 are operated to connect ground over conductor 205 to sleeve conductor 204 to hold the switchtrain operated, and during the silent interval ground is connected through contacts of relay 2AS1 and over conductor 210 to sleeve conductor 204 to hold the connection. The connection is, therefore, temporarily held before the called customer is alerted.

Relay 2AS1, in operating, also connects ground to conductor 208 to start the four-second timer 209 which is used to time the silent interval between bursts of simulated audible ringing tone to detect when the called customer answers. More specifically, as long as the called customer at station 400 remains on-hook a signal comprising a two-second tone burst of the simulated audible ringing tone followed by a four-second silent interval will be transmitted back over the connection to the calling party. Each time the tone is received relays 2F1 and 2F2 operate to operate relay 2TDA. Relay 2TDA, in operating, releases relay 2AS1 to recycle four-second timer 209. This action continues until the called party answers tripping the ringing and removing the simulated audible ringing tone from the connection or until the calling customer abandons a call.

If the calling party should abandon the call before the called party answers, the connection at the called party's switching office would release and remove the simulated ringing tone from the line. With the simulated ringing tone removed relays 2F1 and 2F2 release, operating relay 2TDA which in turn operates relay 2AS1. Relay 2AS1 causes timer 209 to time out after four seconds to operate relay 2AS and start timer 212. When timer 212 operates it actuates relay 2TO to remove the ground from conductor 210 and sleeve conductor 204, and the switchtrain at office A releases in the normal manner.

Let is now be assumed, however, that the called customer at station 400 answers a call by lifting his receiver. When the receiver at station 400 is off-hook, a circuit is completed including battery, ringing source 404, conductor 424, operated contacts of relay 4D, conductor 426, operated contacts of relay 4RB, line conductor 428, the switch hook contacts (not shown) of staiton 400, line conductor 427, operated contacts of relay 4RB, conductor 425, operated contacts of relay 4D, conductor 423, the winding of relay 4TP, ringing source 404 and ground. Tripping relay 4TP operates over this circuit and removes battery from conductor 429 to disconnect ringing source 404 from the line. In addition, relay 4TP interrupts the holding circuit for relay 4RB, and relay 4RB releases. When relay 4RB releases, line conductors 427 and 428 are coupled to the tip and ring conductors 407 and 408 permitting the customer at station 400 to converse with the calling party over the established connection. Relay 4RB, in releasing, also restores timers 419 and 422 to normal and reconnects ringing detector 401 to the line in preparation for trapping subsequent nuisance calls.

At calling office A when the simulated ringing tone is removed from the line, relays 2F1 and 2F2 fail to operate at the end of the four-second silent interval to recycle timer 209, and timer 209 times out. When timer 209 times out, it connects ground to conductor 211 to operate relay 2AS indicating that the called party has answered. Relay 2AS, in operating, provides an additional path for connecting ground over conductor 210 to the sleeve conductor 204 to hold the switchtrain operated at office A and prevent the calling customer from disconnecting.

When relay 2AS operates it also extends ground from normal contacts of relay 2OR, over conductor 220, through operated contacts of relays 2AS and 2TD to start the 15-second timer 212. The 15-second timer 212 will begin timing an interval during which the called customer must transmit a special low frequency modulated noise signal over the nuisance call connection to maintain the holding condition on the calling office switchtrain. Thus, on legitimate calls the called customer would not send this special auxiliary signal and after the 15-second interval, timer 212 would operate relay 2TO to remove the ground from conductor 210 and permit the switchtrain to release when the parties disconnect at the termination of the call. The operation of relay 2TO also causes relay 2TD to release and allow the ring counter 202 to resume scanning.

Let it be assumed, however, that the called customer at station 400 wishes to have this call traced, to determine which line originated the call. The customer at station 400 merely operates a signaling device, such as key 433, which completes an obvious operating circuit for relay 4TT. Relay 4TT will cause a low frequency modulated noise signal to be transmitted over the nuisance call connection to the calling office to initiate tracing the connection thereat.

The nature of the signal transmitted over the nuisance call connection should be such that it is not discernible by the calling party. An arrangement for signaling over a telephone connection in this manner is disclosed in the copending application of A. L. Hopper Ser. No. 379,587, filed on July 1, 1964, now Patent 3,406,344, issued October 15, 1968, and the Hopper patent is hereby incorporated by reference as though fully disposed herein.

In the Hopper application there is disclosed an arrangement for transmitting low information rate data signals using the speech frequency signals as a carrier wave. The speech signals are supplied directly to a modulator wherein they are combined with data signals from an auxiliary low frequency signal source. The auxiliary signals which represent the information to be transmitted may be any form of low frequency signals such as slowly varying alternating-current wave, pulse code signals, etc.

In the exemplary embodiment of our invention instead of using speech signals from the called customer for the carrier wave, noise generator 405 furnishes a low level noise signal in the voice frequency range which can be modulated by a low frequency information carrying signal. With the disclosed arrangement the signal is under the control of the customer at station 400 and the need for talking to the nuisance caller is eliminated. In addition, the nuisance is not forewarned of the trap by the presence of a slight amount of low level noise on the nuisance call connection. In the alternative, the called party's speech signal instead of a noise signal could be used as a carrier wave for the low frequency signal in the manner described in the aforementioned Hopper application. The noise signal from generator 405 is combined with the low frequency information signal from source 430 by modulator 406 and transmitted over conductors 431 and 432 through contacts of relay 4TT and back over tip and ring conductors 407 and 408 and the nuisance call connection to the calling office. Since the noise carrier wave is within the voice frequency range, say approximately 300 c.p.s. to 3,000 c.p.s. and the auxiliary signal is around 55 c.p.s., the modulated signal only extends from 345 c.p.s. to 3,055 c.p.s. and is within the transmission capabilities of the facilities between offices A and B.

The only requirement of the auxiliary signal is that it be of a higher frequency than the syllabic rate and a lower frequency than the lowest voice signal anticipated from the customer's speech. Since some low pitch voice signals are found in the vicinity of 80 c.p.s. it is desirable to use an auxiliary signal below this frequency.

The low level noise signal modulated by the low frequency auxiliary signal is transmitted to the calling customer at station 108, but due to its characteristics it is virtually imperceptible. The signals are also transmitted over conductors 119 and 120, through gates 116 and 117, over conductors 221, 222, 215 and 216, through preference chain and connector circuit 214 to envelope detector 201. The auxiliary signal information is recovered in envelope detector 201, and filter 217 filters out all other signals that may be present. The auxiliary signal is then passed on to rectifier 218 which converts the low frequency signal into a usable direct-current potential for operating relay 2OR.

Relay 2OR, in operating, locks to ground on conductor 219 from the contacts of pushbutton 2PB. In addition, relay 2OR removes the ground from conductor 220 to stop the 15-second timer 212 from operating relay 2TO and thereby maintains the holding condition on the sleeve of the switchtrain at office A. Relay 2OR also connects ground over conductor 223 to actuate alarm bell 224 to signal the central office maintenance man that a nuisance call connection has to be traced. By noting which trunk scanner 202 is locked to and the switches that are closed on trunk link frame 101 and line link frame 100, the maintenance man can trace the connection to ascertain the identity of the calling customer's line.

In the alternative, relay 2OR could initiate the automatic identification of the calling line at office A if office A were equipped with one of the automatic number identification systems which are well known in the art. For example, when relay 2OR operates, ground is extended over conductor 123 in FIG. 1 to actuate identifier control 124. Identifier control 124 places an identifying tone over sleeve conductor 115 and back over the sleeve of the switchtrain connection in office A. The tone is received by automatic number identification equipment 125 from a terminal associated with customer line 108 and identification of the calling line is made. The calling line telephone number can then be registered in register circuit 126.

Suitable automatic number identification systems for use with our invention are well known as exemplified in Patent 3,071,650 to H. D. Cahill and C. H. Dagnall, Jr., of Jan. 1, 1963, and the Cahill-Dagnall patent is hereby incorporated by reference as though fully disclosed herein.

After the connection is traced manually, pushbutton 2PB is operated to release relays 2OR and 2TD and remove the holding condition from the calling office switchtrain. The switchtrain then releases in the normal manner. In the event of an automatic identification these relays would be released by the automatic identification equipment after the calling line is identified.

In this exemplary embodiment of our invention a low frequency modulated noise signal transmitted by the called customer was utilized to block the operation of timer 212 which, if permitted to time out, removes the holding condition from the switchtrain for office A. It will be obvious, however, that this signal might be used to transmit to the calling office information concerning the nuisance call. For example, in a copending application of C. Abert, D. E. Anderson and A. Zarouni, Ser. No. 426,729, filed Jan. 21, 1965, now Patent 3,385,933, issued May 28, 1968, there is shown a call tracing arrangement wherein signals identifying the called customer are transmitted from the called office to the calling office using a series of tones. It will be obvious to those skilled in the art that similar information could be transported to and registered at the calling office using the low frequency modulated signaling technique described above and in the aforementioned Hopper application.

It is to be understood that the above-described arrangements are merely illustrative of the application of the principles of the invention. Numerous other arrangements may be devised by those skilled in the art without departing from the spirit and scope of the invention.

What is claimed is:

1. In a telephone system, a plurality of customer lines; switching means for transmitting ringing signals to called ones of said lines and for transmitting to calling ones of said lines an audible signal indicating that said called lines are being rung; and apparatus for identifying lines calling a particular one of said called lines comprising means for delaying the transmission of said ringing signal to said particular line and for sending over the connection established to said particular line a signal simulating said audible signal, and means responsive to the detection of said simulated signal on one of said connections for blocking the release of the calling line connected thereto.

2. The invention defined in claim 1 wherein said delaying means comprises means for intercepting a ringing signal to said particular line and means controlled by said intercepting means for sending said simulated signal over said established connection and wherein said blocking means comprises means for successively interrogating each said connection for the presence of said simulated signal and means for holding a connection independently of the condition of said calling line connected thereto.

3. The invention defined in claim 2 wherein said transmitting means comprises a ringing source selectively connectable to said particular line for applying said ringing signal thereto, wherein said sending means comprises a tone source for supplying said simulated signal, wherein said intercepting means comprises means responsive to said ringing signal on said particular line for disconnecting said ringing source from said particular line and for connecting said tone source thereto, and wherein said interrogating means comprises a first detector responsive to said simulated signal and means for scanning said connections by sequentially coupling said first detector to each said connection.

4. The invention defined in claim 3 wherein said intercepting means further comprises first means for timing the interval during which said ringing source is disconnected from said particular line to permit the scannnig of said connections and wherein said scanning means comprises circuitry actuated by said first detector in the presence of said simulated signal on said established connection for enabling said holding means.

5. The invention defined in claim 4 wherein said first timing means comprises means effective when actuated for reconnecting said ringing source to said particular line and wherein said interrogating means also comprises a second detector for ascertaining an off-hook condition on said particular line.

6. The invention defined in claim 5 wherein means are provided for transmitting an auxiliary signal over said established connection, and wherein said interrogating means further comprises second timing means effective when actuated for disabling said holding means and a third detector responsive to said auxiliary signal for rendering said second timing means ineffective to disable said holding means.

7. In a telephone system, a plurality of calling and called lines each having a customer station coupled thereto; communication paths; switching means for interconnecting said lines over said paths including means for ringing said called stations and for transmitting to said calling stations an audible ringing signal indicating to the customers thereat that said called stations are being rung; and apparatus for identifying lines calling a designated one of said called lines comprising means for intercepting ringing signals to said designated line, means for marking the one path connected to said designated line comprising means for sending over said one path a spurious audible ringing signal distinguishable from said audible ringing signal in a manner imperceptible to the customer at the calling station connected thereto, means for discriminating on said paths between said spurious signal and said audible ringing signal and means controlled by said discriminating means for blocking the release of the calling station from said one path over which said spurious signal was sent.

8. The invention defined in claim 7 wherein said audible ringing signal comprises a sequence of first audible signals; wherein said marking means comprises a source of second audible signals and means including said source for generating said spurious signals in said same sequence; and wherein said discriminating means comprises first sensing means responsive only to said second audible signals, means for coupling said first sensing means to said paths and means controlled by said first sensing means for enabling said blocking means.

9. The invention defined in claim 8 wherein said marking means also comprises means controlled by the station coupled to said designated line for interrupting the sequence of said spurious signals when said designated station goes off-hook, wherein said first sensing means comprises means for detecting when said spurious signal sequence is interrupted, and wherein said blocking means comprises first means for holding said calling line connected to said one path in the presence of said spurious signals and second means for holding said calling line connected to said one path under control of said detecting means.

10. The invention defined in claim 9, wherein said marking means also comprises means actuated by said designated station for transmitting over said one path an information signal comprising a carrier wave in the voice frequency range modulated by a data signal below the voice frequency range and wherein said discriminating means further comprises timing means effective when operated for disabling said second holding means and second sensing means responsive to said data signal for blocking the operation of said timing means.

11. The invention defined in claim 10, wherein said second sensing means comprises means for causing the identification of the calling line connected over said one path to said designated line.

12. An arrangement for trapping annoyance calls in a communications system comprising a plurality of customer lines each including a station, switching means for establishing connections between a calling one of said lines and a called one of said lines including means for signaling over said called line to alert the station coupled thereto, means controlled by the operation of said calling and called stations for releasing said connection, and means enabled by said switching means before an alerting signal is applied to said called station for holding said connection independent of said switching means and the operation of said calling station.

13. The invention defined in claim 12 wherein said holding means comprises means for automatically maintaining said calling line coupled to said established connection for a prescribed interval independently of the operation of said called station responding to said alerting signal.

References Cited

UNITED STATES PATENTS

| | | | |
|---|---|---|---|
| 2,077,537 | 4/1937 | Taylor | 179—27 |
| 2,131,568 | 9/1938 | Peterson | 179—27 |
| 2,131,572 | 9/1938 | Saunders | 179—27 |
| 2,200,820 | 5/1940 | Boswau | 179—27 |
| 3,385,933 | 5/1968 | Abert et al. | 179—27 |

FOREIGN PATENTS

| | | |
|---|---|---|
| 1,211,278 | 2/1966 | Germany. |

KATHLEEN H. CLAFFY, Primary Examiner

D. L. RAY, Assistant Examiner